T. ARTHUR & L. M. MORRIS.
VEHICLE WHEEL BOXING.
APPLICATION FILED NOV. 30, 1915.
1,190,079.
Patented July 4, 1916.
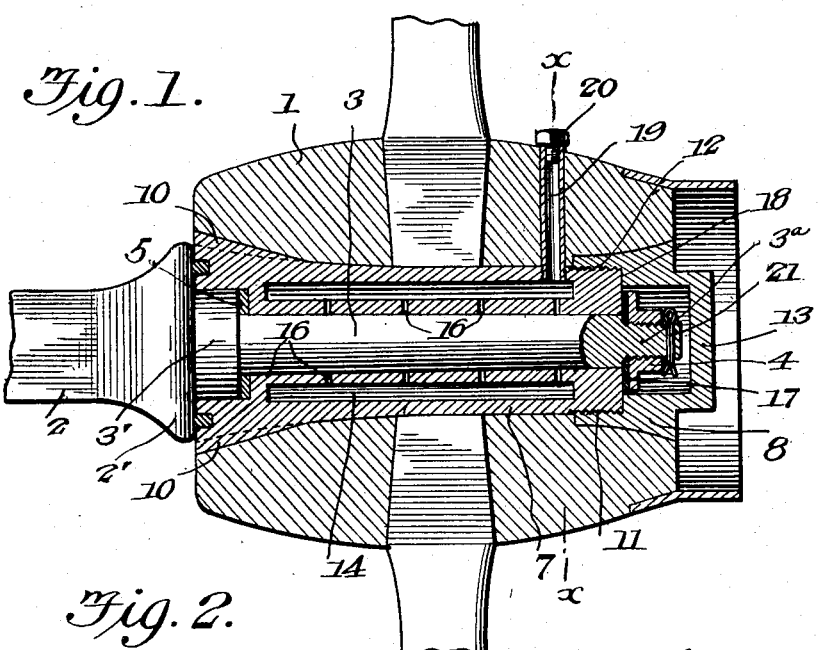
Fig. 1.
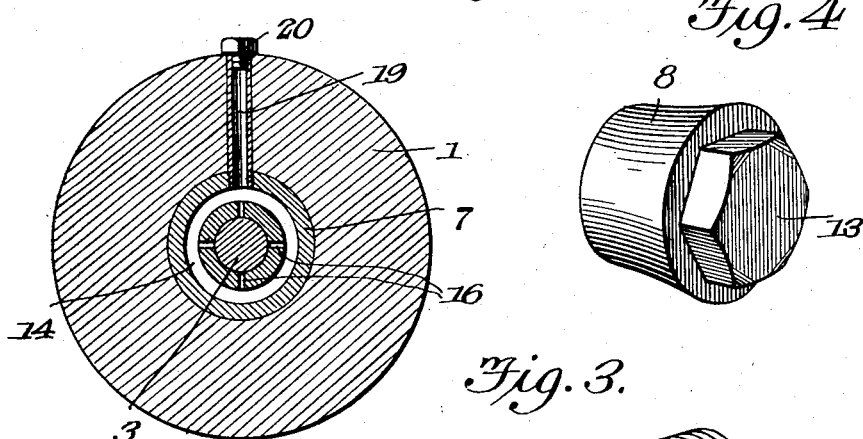
Fig. 2.
Fig. 4.
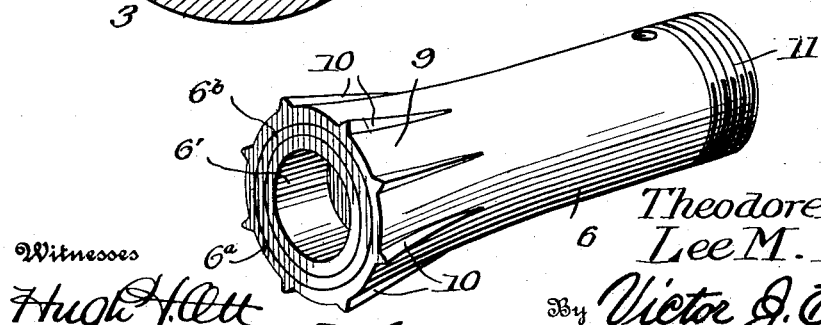
Fig. 3.
Witnesses
Hugh H. Ott
Inventors
Theodore Arthur
Lee M. Morris
By Victor J. Evans
Attorney
THE NORRIS PETERS CO., PHOTO-LITHO., WASHINGTON, D. C.

UNITED STATES PATENT OFFICE.

THEODORE ARTHUR AND LEE M. MORRIS, OF MONTGOMERY, WEST VIRGINIA.

VEHICLE-WHEEL BOXING.

1,190,079.  Specification of Letters Patent.  Patented July 4, 1916.

Application filed November 30, 1915. Serial No. 64,300.

*To all whom it may concern:*

Be it known that we, THEODORE ARTHUR and LEE M. MORRIS, citizens of the United States, residing at Montgomery, in the county of Fayette and State of West Virginia, have invented new and useful Improvements in Vehicle-Wheel Boxings, of which the following is a specification.

The present invention relates to improvements in the construction of boxings for the hubs of vehicle wheels, and for the spindles of the axles received in the said boxings.

In carrying out our invention it is our purpose to provide a hub with a boxing comprising a lubricant reservoir, to arrange the same with ports which communicate with the spindle of the axles when the latter is received in the boxing, and to so construct the axle or spindle and to so associate the boxing with the hub of the wheel that the lubricant will be confined to the spindle of the axle without danger of the same escaping through the ends of the boxing.

A further object of the invention is to provide a boxing for a vehicle which is provided with an engaging member that will prevent the rotation of the boxing independent of the hub of the vehicle, to provide the said boxing with a reservoir forming a lubricant receptacle, to provide a cap member for the outer end of the boxing which will inclose the cap screw of the axle spindle, and to form the said spindle with an annular enlargement or sleeve at its juncture with the axle proper to be received within a suitable pocket in the annular depression of the boxing and to further arrange suitable compressible washers between the cap nut of the spindle and the enlargement or sleeve of the said spindle as well as upon the rear face of the boxing to prevent the escape of the lubricant through the ends of the boxing.

With the above and other objects in view, the improvement resides in the construction, combination and arrangement of parts set forth in the following specification and falling within the scope of the appended claims.

In the drawing: Figure 1 is a central longitudinal sectional view of a vehicle hub provided with a boxing constructed in accordance with the present invention and an axle having its spindle arranged within the bore of the boxing, Fig. 2 is a transverse sectional view approximately on the line $x$—$x$ of Fig. 1, Fig. 3 is a perspective view of the boxing, and Fig. 4 is a similar view of a cap for the boxing.

Referring now to the drawings in detail, the numeral 1 designates a wooden vehicle hub of an ordinary wheel, the same having its bore provided with a boxing constructed in accordance with our invention.

The numeral 2 designates the vehicle axle and 3 the spindle for the axle which is adapted to be received in the boxing, indicated generally by the numeral 6. The spindle 3 at its inner end is provided with an annular enlargement 3' formed upon the enlarged end 2' of the axle 1, and this enlargement is adapted to be received within an annular pocket 6' provided upon the inner end of the boxing 6.

The numeral 5 designates a compressible washer which is arranged within the pocket 6' and which is disposed in contact with the outer surface of the enlargement 3', while the rear face of the boxing 6 is also provided with an annular depression $6^a$ which receives a compressible washer $6^b$ that contacts with the enlarged end 2' of the axle 2. The bore of the boxing 6 is adapted to snugly receive the spindle 3, while the reduced threaded extension $3^a$ of the said spindle projects beyond the outer face of the boxing and is engaged by a flanged or cap nut 4, a compressible washer 17 being arranged between the said nut and the outer face of the boxing. The boxing, adjacent its outer end, is provided with exterior threads 11 which co-act with interior threads 12 provided in a cap nut 8, the outer and closed end of the said nut, indicated by the numeral 13, is provided with angular sides to permit of a wrench being readily applied thereto to remove the same from the boxing 6. The bore of the cap 8 is adapted to snugly receive the cap or carriage nut 4, and the outer face of the boxing 1 is provided with a suitable depression to receive the substantially flared outer periphery of the cap nut 8. The opposite or rear end of the boxing 6 is flared outwardly, as at 9, and said flared portions are provided with longitudinally extending ribs 10 which provide cutter members which are forced in the hub 1 to sustain the boxing against accidental rotation with relation to the said hub.

The boxing 6 is provided with a longitudinally extending annular channel 14, the same having ports 16 which communicate with the bore of the boxing, the channel 14 providing a lubricant reservoir and the said lubricant is fed through the ports 16 to the spindle 3 of the axle 2. By providing the compressible members 5, 6$^b$ and 17 it will be noted that the liquid lubricant is confined to the spindle of the axle and that the same cannot escape through either end of the bore of the boxing 6. The boxing 6 at its threaded end 11 is provided with a threaded orifice to receive the threaded end of a tube 19, and the numeral 20 designates a removable, preferably threaded cap, which normally closes the said tube 19. The tube, of course, provides an inlet for a lubricant to the chamber or reservoir 14, and from the above description, taken in connection with the accompanying drawings, the simplicity of the device, as well as the advantages thereof will, it is thought, be perfectly apparent to those skilled in the art to which such invention appertains without further detailed description.

Having thus described the invention, what we claim is:

1. The combination with a vehicle hub, of a boxing arranged within the bore thereof, said boxing having a flared end provided with sharpened members which enter the hub, the boxing having its rear flared end provided with an annular pocket which communicates with its bore, said flared end being further provided with a circumferential depression, a gasket within the depression, a gasket within the pocket, an axle having a spindle, said spindle received within the bore of the said boxing, said spindle having an enlarged annular portion received within the pocket of the boxing and the axle having its end portion adjacent the spindle also enlarged and contacting with the annular compressible member in the annular depression in the boxing, the boxing being centrally formed with a longitudinally extending lubricant receptacle and having ports communicating with its bore, a flanged nut, a compressible element between the nut and the end of the boxing, and a hollow threaded cap secured to the reduced end of the boxing and surrounding the nut for the spindle.

2. The combination with a vehicle hub, of a boxing for the hub, said boxing comprising a portion having its outer end thickened and flared toward its inner end, and the said outer end threaded, longitudinally extending ribs on the flared portion of the axle adapted to be forced in the hub, said boxing having a longitudinally extending interior lubricant receptacle and having ports leading therefrom to the bore of the boxing, a tube extending from the boxing and communicating with the receptacle, a cap for the tube, and a hollow cone-shaped cap secured to the threaded outer end of the boxing.

THEODORE ARTHUR.
LEE M. MORRIS.

Witnesses:
T. S. KELLY,
S. E. CLAYPOOL.

Copies of this patent may be obtained for five cents each, by addressing the "Commissioner of Patents. Washington, D. C."